(12) United States Patent
Sandler

(10) Patent No.: US 9,032,910 B2
(45) Date of Patent: May 19, 2015

(54) ANIMAL LEASH AND HARNESS

(76) Inventor: Shelley Sandler, New York, NY (US)

( * ) Notice: Subject to any disclaimer, the term of this patent is extended or adjusted under 35 U.S.C. 154(b) by 0 days.

(21) Appl. No.: 13/199,133

(22) Filed: Aug. 19, 2011

(65) Prior Publication Data

US 2012/0060768 A1 Mar. 15, 2012

Related U.S. Application Data

(60) Provisional application No. 61/381,091, filed on Sep. 9, 2010.

(51) Int. Cl.
*A01K 27/00* (2006.01)

(52) U.S. Cl.
CPC ............. *A01K 27/002* (2013.01); *A01K 27/003* (2013.01)

(58) Field of Classification Search
USPC .......... 119/712–715, 792, 793; 297/464–488; 602/20–30
See application file for complete search history.

(56) References Cited

U.S. PATENT DOCUMENTS

| | | | | |
|---|---|---|---|---|
| 2,187,021 A * | 1/1940 | Everson | | 119/792 |
| 4,559,906 A * | 12/1985 | Smith | | 119/865 |
| 5,035,203 A * | 7/1991 | Cardenas | | 119/771 |
| 5,743,216 A * | 4/1998 | Holt, Jr. | | 119/793 |
| 5,794,571 A * | 8/1998 | Goldberg | | 119/792 |
| 5,934,224 A * | 8/1999 | Sporn | | 119/792 |
| 6,085,694 A * | 7/2000 | Simon | | 119/792 |
| 6,397,784 B1 * | 6/2002 | Morgan-Albertson et al. | | 119/792 |
| 6,401,666 B1 * | 6/2002 | Kircher | | 119/792 |
| 6,708,650 B1 * | 3/2004 | Yates | | 119/792 |
| 7,131,400 B2 * | 11/2006 | Wanveer et al. | | 119/792 |
| 7,166,760 B1 * | 1/2007 | Talbot | | 602/41 |
| 8,100,090 B1 * | 1/2012 | Sutter | | 119/793 |

* cited by examiner

*Primary Examiner* — David Parsley
*Assistant Examiner* — Danielle Clerkley

(57) ABSTRACT

A collar/harness and optionally leash system and method for assembling, using and manufacturing the same is provided. The system may include a single strap including means for connecting attached along the strap at positions predefined to be assembled to form a first loop adapted for use as a collar and a second loop adapted for use as a harness. The first and second loops of the assembled strap may form a figure-eight design.

10 Claims, 5 Drawing Sheets

STEP 1    STEP 2    STEP 3    STEP 4

STEP 5    STEP 6    STEP 7    STEP 8    STEP 9

ANIMAL LEASH AND HARNESS

REFERENCE TO RELATED APPLICATION

This application claims the benefit of U.S. Provisional Patent Application Ser. No. 61/381,091, filed Sep. 9, 2010, entitled "Animal Leash and Method of Leashing an Animal," which is incorporated herein by reference in its entirety.

FIELD OF THE INVENTION

Embodiments of the present invention relate to a new and improved animal collar, harness and/or leash system, and to such devices particularly well-suited for use on a dog.

BACKGROUND OF THE INVENTION

Conventional collars and leashes attach about an animal's neck. When the leash is pulled, the force exerted on the leash pulls the animal throat, which causes discomfort and can cause injury to the animal. To reduce such force around the neck and protect animals from discomfort, harnesses were developed.

Conventional harnesses include a network of straps which attach to an animal's chest to distribute the force of pulling away from the animal's neck. However, animals are able to exert much more force using the leverage of their chest than their necks. Thus, a walker may require more force to handle an animal using a harness than a standard collar. This difficulty becomes particularly problematic when walking larger dogs, when the strength of the dog is near or exceeds the strength of the walker.

There is a need in the art for an animal leash and harness to alleviate discomfort to the animal, while optimizing the walker's ability to control the animal.

SUMMARY OF THE INVENTION

Some embodiments of the invention may include a system and method for the use, assembly and manufacture of a combination collar, harness and optionally leash system. The system may include a single strap including means for connecting attached along the strap at positions predefined to be assembled to form a first loop adapted for use as an animal collar and a second loop adapted for use as an animal harness. The first and second loops of the assembled strap may form a figure-eight design. In some embodiments, an end of the single strap may extend to form an integrated leash.

BRIEF DESCRIPTION OF THE DRAWINGS

Specific embodiments of the present invention will be described with reference to the following drawings, wherein.

Figure 1:
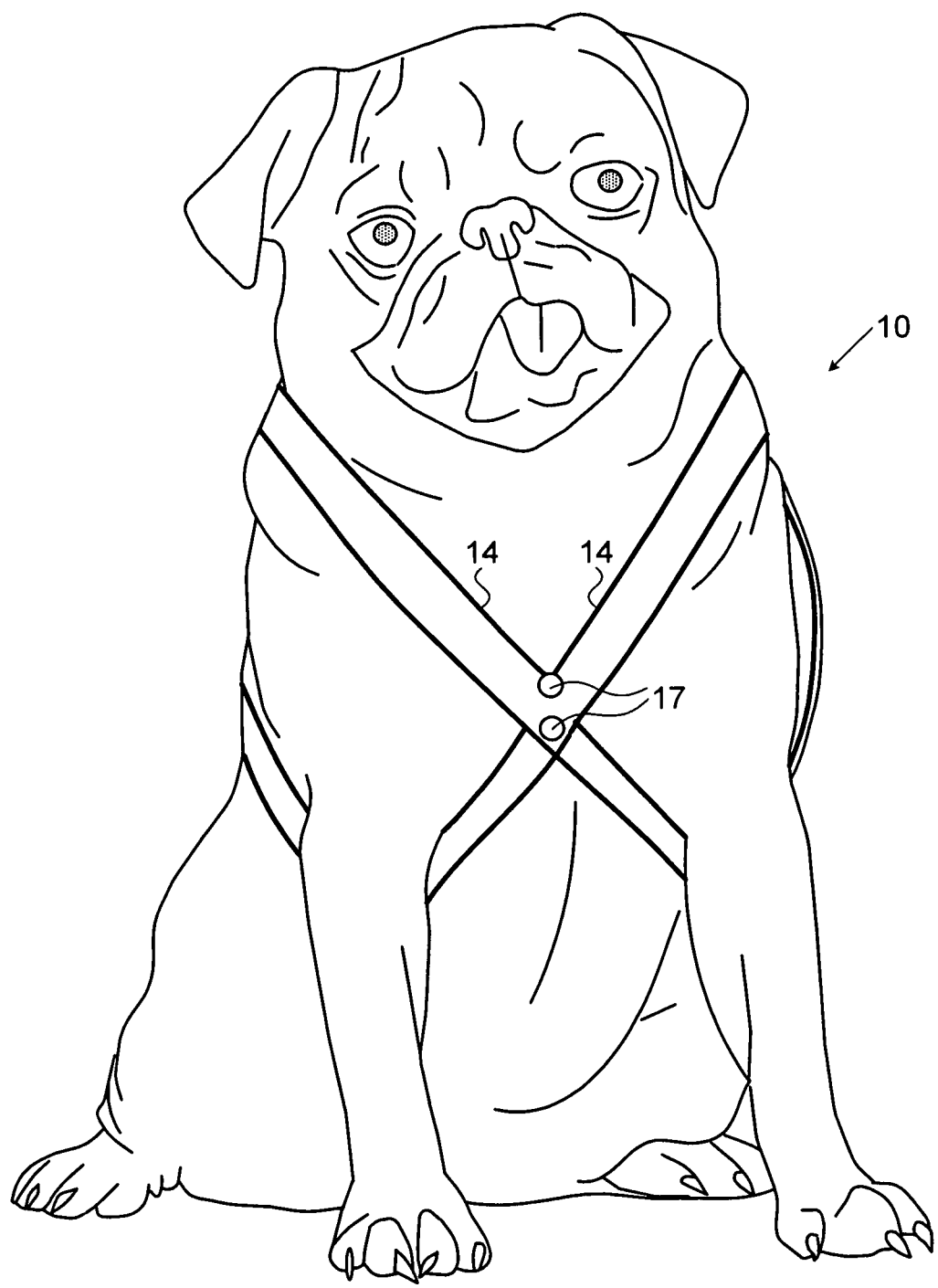
FIGS. 1-3 are schematic illustrations of a front view, back view and perspective view of a system including a collar, harness and optional leash, respectively, in accordance with some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Embodiments of the present invention provide a simple and easy to manufacture design for a combination collar/harness (and optionally/leash) system comprising a single strap or length of material, which when folded, for example, in a figure-eight design, provides a collar (e.g., a top loop of the figure-eight), a harness (e.g., a bottom loop of the figure-eight) and optionally a leash (e.g., the remaining strap material extending from the figure-eight). The strap may include means for connecting such assembly, such as buttons or snaps, positioned along the length of the strap to connect strap segments that cross or intersect in the figure-eight design. In particular, connecting means may be provided at a first connection point at the intersection or cross point of the figure-eight design to separate or divide the top and bottom loops. Such connection may define the collar segment (top loop) to have a fixed or adjustable size, for example, so that it would not strangle an animal when pulling. A second connection point may be provided to close or complete the figure-eight loop, for example, to define harness segment (bottom loop) to have a fixed or adjustable size, for example, so that the body of the animal fits snugly fits and would not slip out when pulling.

To enable this unique assembly, complementary fitting connecting means (e.g., male and female fitted units or opposite Velcro surfaces) may be positioned at the first and second connection points on both connecting surfaces. For example, a minimum of four snaps (two male and two female) may be provided for two connection points, although mote connecting means may be used. The locations of these connection points along the length of the strap may define the size of the collar (top loop) and harness (bottom segment). Accordingly, the locations of these connection points may be fitted to the size of the neck and chest of the animal. In some embodiments, adjustable connecting means are provided to form loops of different sizes and thus, fit differently sized animals. For example, a cluster of multiple fixed-position connecting means or a single movable connecting means may be provided near the first intersection point and another near the second intersection point, from which the best-fitting connecting means may be chosen when the system is assembled for each particular animal (as well as to adjust to the growth of and or size change in each particular animal). Examples of connecting means may include, but are not limited to, buttons, snaps, fasteners such as D-rings, velcro, slideable tabs, or other connecting devices.

Embodiments of the present invention provide a superior method of manufacture for a combination collar/harness (and optional leash) system since the system comprises only a single strap (although more than one strap may be used or added). The single strap may be folded and assembled in such a way to provide all the functionality of more complex harness/leash systems, which require many straps (e.g., four or eight straps), pre-connected in a complex network design. The simple single strap design may be relatively simple and inexpensive to produce.

The combination collar/harness (and optional leash) system may be assembled by folding the strap, for example, in a figure-eight and/or mobius strip formation. The strap system may be assembled on the animal to form a loop the size of the animal's neck and a loop the size of the animal's torso or mid-section or may be assembled off of the animal as wider openings which are then adjusted by tightening the loops on the animal. The first loop (e.g., the collar) may be formed by twisting and folding a mid-segment of the strap, such as the loop of a ribbon, and closing the loop at a first intersection point by the connecting means, such as male and female snaps on opposite connecting surfaces (e.g., see steps 1 and 2 of FIGS. 4 and 5). Once the loop of the ribbon is fixed as the collar (e.g., around the animal's neck), the two ends of the ribbon may be, for example, pulled under the animal's midsection and re-joined around the animal's back, to form a second loop at the second intersection point (e.g., see steps 3 and 4 of FIGS. 4 and 5). In one embodiment, the system may be a combination collar/harness/leash system in which the leash is integral to and extends from the single strap of material (e.g., shown in FIG. 4). In such embodiments, the strap may be folded with one longer end to form the leash. In another embodiment, the collar/harness system does not include a leash (e.g., shown in FIG. 5) and the ends of the strap may be folded at approximately equal length to complete the collar/harness system as a figure-eight design (e.g., see step 9 of FIG. 5). In such embodiments, a separate leash may be attached to the second mid-section loop (e.g., at or near the second intersection point, at the top of the animal's back).

In contrast with conventional harnesses formed of many separate pieces sewn and webbed together, embodiments of the invention use only a single length of material, which is adapted for assembly by the unique arrangement of connecting means, to produce an advanced network of loops and cavities used to restrain an animal. Furthermore, conventional harnesses attach and distribute weight across the front of the animal's chest, whereas the collar/harness system designed according to embodiments of the invention, distribute weight not only to the chest area, but also to the underside or midsection of the animal (e.g., around the rib-cage). Since animals have less leverage to pull from their mid-section, they are easier to control (using less force) compared to conventional front attached harnesses. In addition, in an emergency situation, since the collar/harness system forms a loop around the animal's back, the animal may be more easily picked up, moved, or restrained by grabbing the loop, for example, especially for smaller animals, as compared to conventional harnesses. Other advantages may be realized using the collar/harness system designed according to embodiments of the invention.

Figure 2:
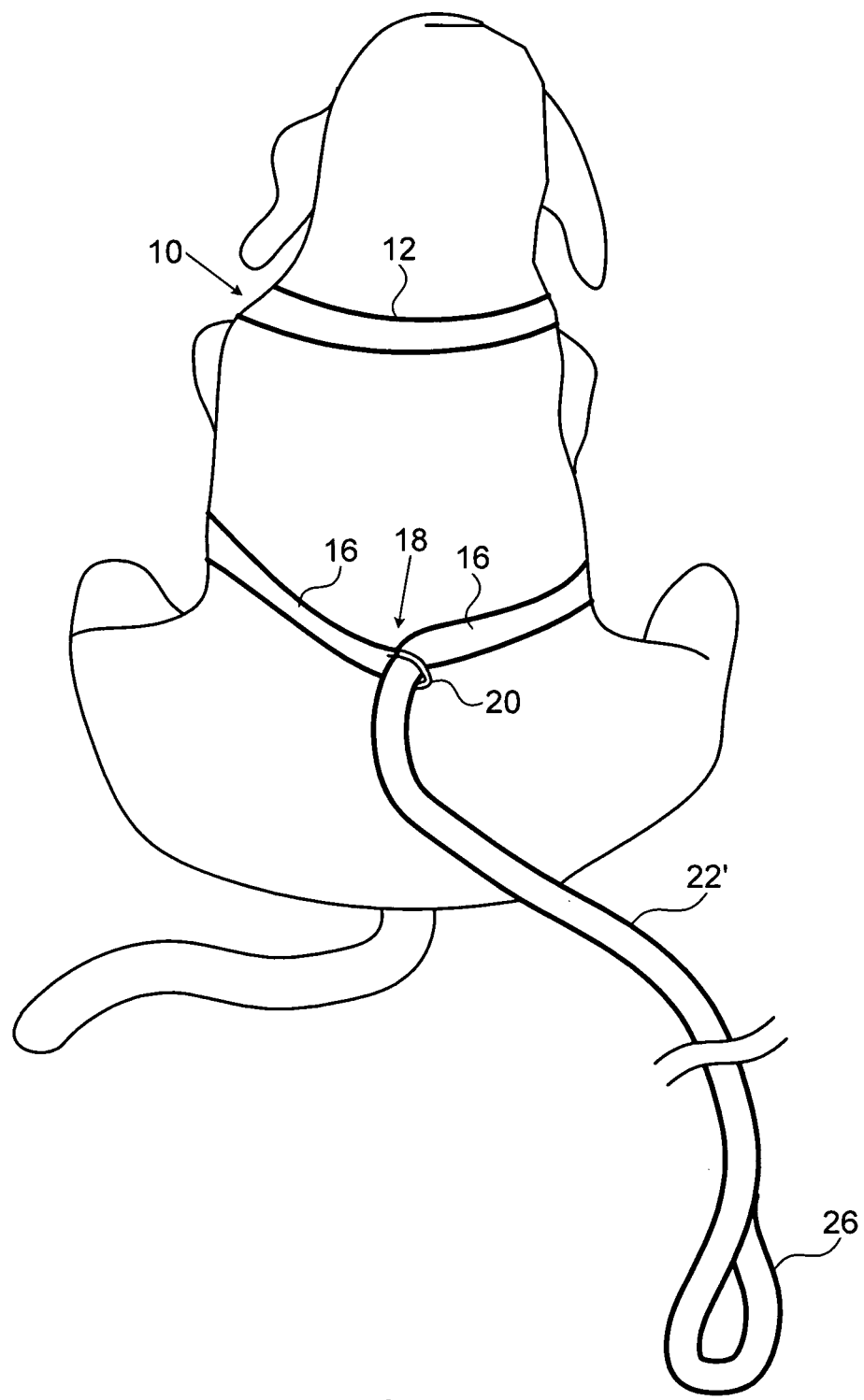
Figure 3:
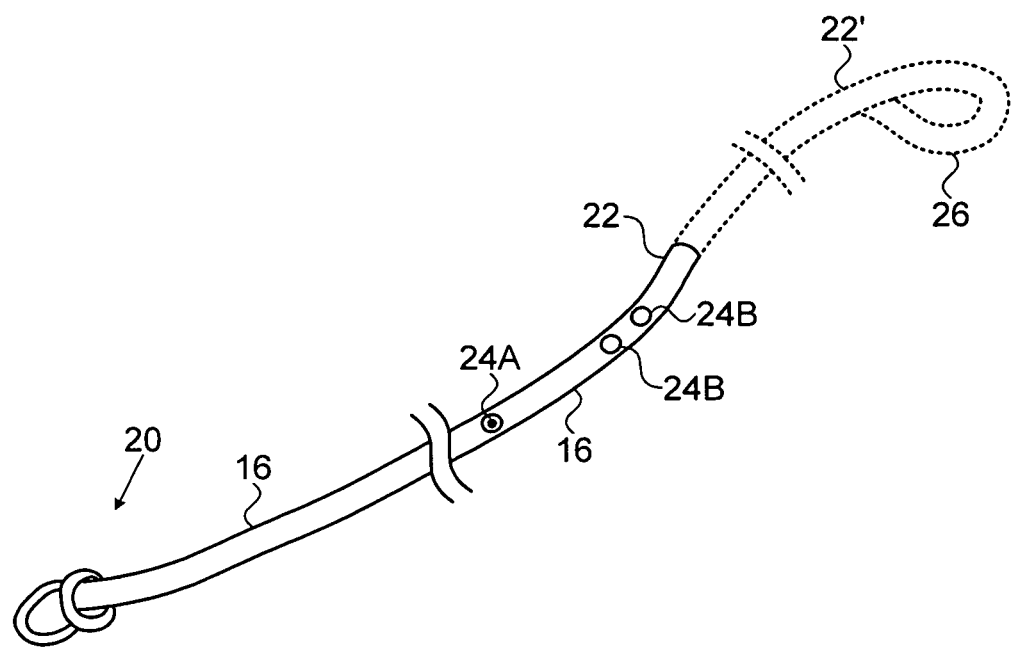

Reference is made to FIGS. 1-3, which schematically illustrate a system 10 including a collar, harness and optional leash, in accordance with some embodiments of the invention. FIG. 1 shows a front view of an animal wearing the collar/harness and/or leash system 10, FIG. 2 shows a back view of an animal wearing collar/harness and/or leash system 10, and FIG. 3 shows a perspective view of collar/harness and/or leash system 10.

System 10 is an elongated strap, which when assembled forms a collar, a harness and, optionally, a leash. System 10 is adapted to wrap around the neck of the animal and the midsection of an animal in a pair of spaced loops separated by crossing across the animal's chest in a unique manner to bind the animal snugly but comfortably.

System 10 includes strap segments 12, 14, 16. Strap segment 12 extends transversely across the back, in the area of the animal's neck (as shown in FIG. 2) and wraps around the animal's front via strap segments 14 that connect via connecting means 17 at a first intersection point (as shown in FIG. 1) to form a collar. Strap segments 14 cross the animal's chest, passing behind the forelegs (as shown in FIG. 1), and return to the back of the animal as strap segments 16 that connect via connecting means 20 at a second intersection point 18 (as shown in FIG. 2) to form a harness.

A leash may be integral to system 10 or connectable thereto. The leash may extend from approximately the midpoint of the animal's back, for example, at second intersection point 18. An integral leash may include a strap end 22' extending from strap segments 16, while a connected leash may be linked to system 10, for example, via connecting means 20. System 10 thus provides a sturdy connector for the leash portion, adapted to control the animal with minimal discomfort.

In one embodiment where the leash is integral to system 10, the two strap segments 16 may have different lengths (shown by dashed lines in FIG. 3), where the longer segment 16 forms a leash. Strap segments 16 may be inter-engaged together via connecting means 20. A first end of the strap may be provided with connecting means 20, such as, a pair of metallic loops (e.g., D-rings), through which the other strap end 22' attached, for example, by threading over one ring and under the other to cinch the collar snugly but comfortably around the animal. Strap end 22' may extend from system 10 and terminate at its distal end in a loop 26, which may be adjustable, for example, to fit the walker's hand. When the collar is wrapped about the animal's body, with strap end 22' passed through connecting means 20 to cinch the collar about the body, the elongated end portion 22' leashes the animal.

In a second embodiment where the leash is separate from system 10, the two strap segments 16 may have approximately equal lengths (shown by solid lines in FIG. 3). The collar may have a length such that, when assembled, it wraps around the body of the animal as in the first embodiment, but terminates at strap end 22 near of at connecting means 20. The collar portion may again be cinched snugly but comfortably about the animal. In some embodiments, strap end 22 may include connecting means 24a,b to connect to the strap, for example, to prevent strap end 22 from flapping and the collar from loosening. Additional connecting means 24a,b may be positioned near connecting means 20 on one or both sides thereof along the longitudinal axis of the strap. For example, snap or button connecting means 24a,b may prevent ring connecting means 20 from loosening. A plurality of connecting means 24a,b may be located along strap end 22 to accommodate animals of different sizes, avoiding the need for differently-sized straps. A conventional leash may be snapped or otherwise connected to system 10. System 10 may be wrapped about the animal so that connecting means 20 are preferably positioned at the lateral center of the animal's back, thus providing a convenient central point for affixation of the leash.

System 10 may be a single continuous length of material, which may be fabricated of, for example, leather, vinyl, plastic, or like material. In the example of FIG. 3, connecting means 17 and 24a,b are shown to be male/female snaps ends and connecting means 20 are shown to be loops or rings, although any other connecting means may be used.

Figure 4:
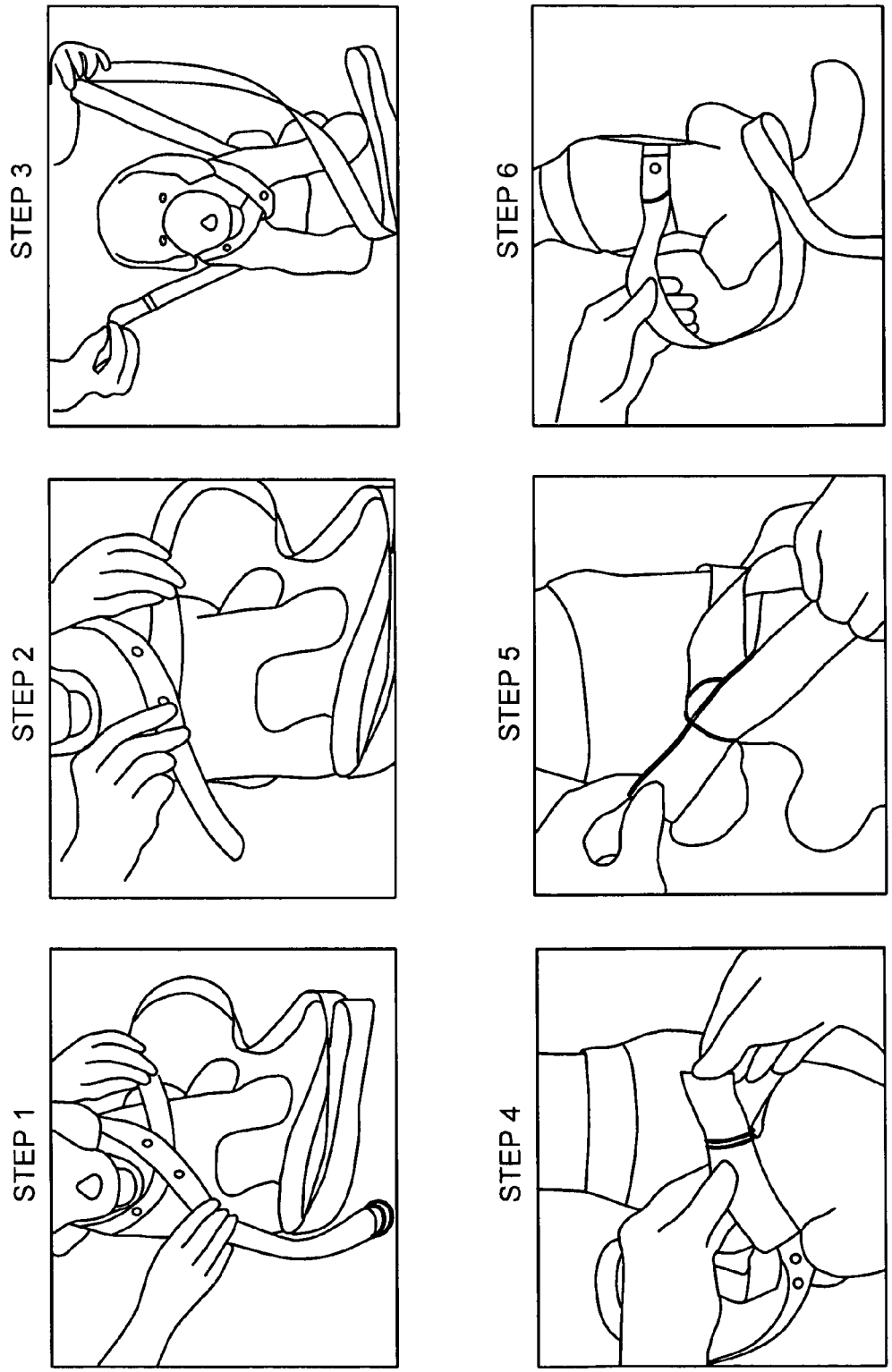
FIGS. 4 and 5 are schematic illustrations of steps for assembling the collar/harness system of FIG. 1 using a separate leash and using an integrated leash, respectively, in accordance with some embodiments of the invention.
Figure 5:
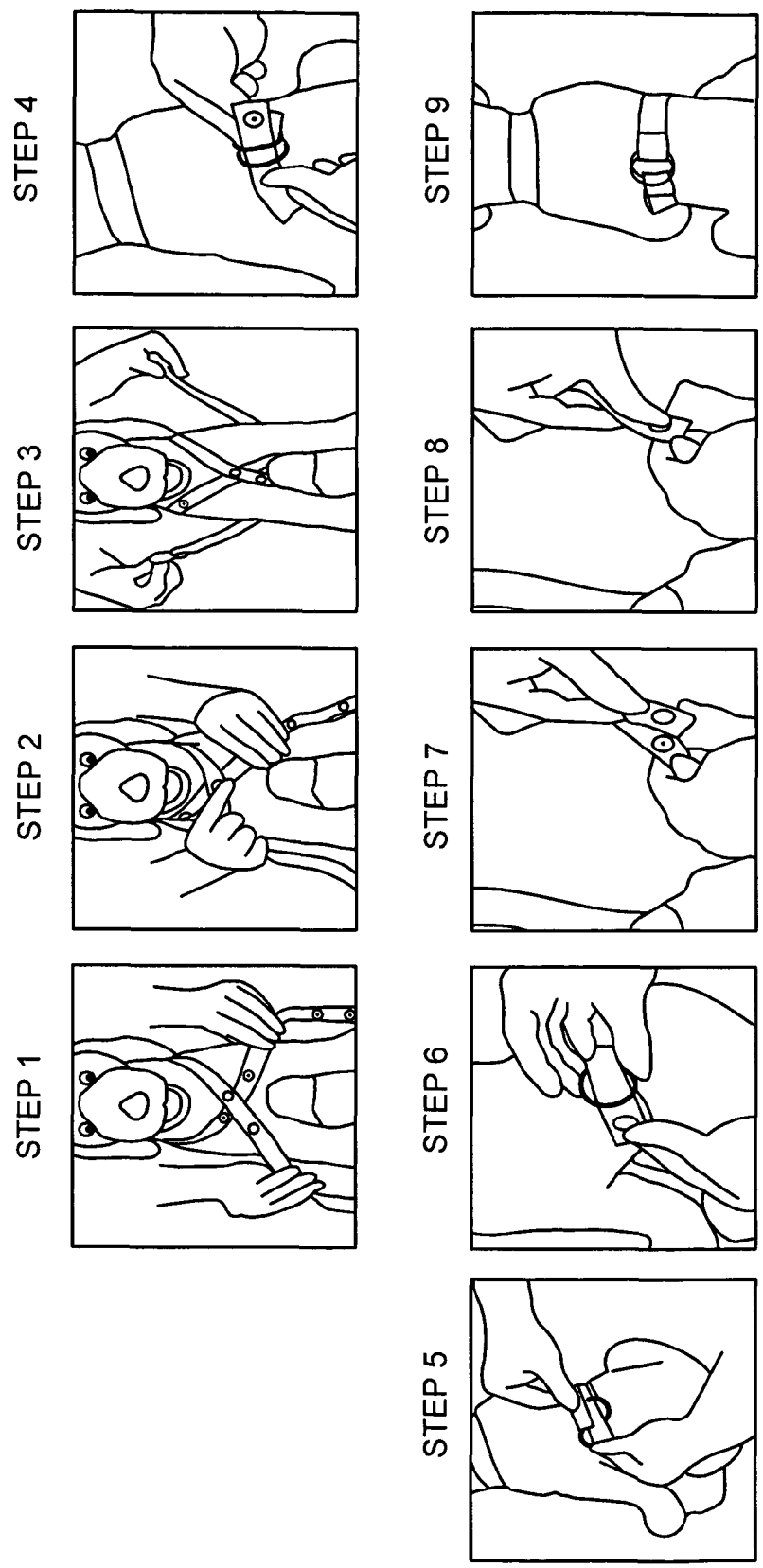

Reference is made to FIGS. 4-5, which schematically illustrate the steps for assembling the collar/harness and optional leash system of FIG. 1, in accordance with some embodiments of the invention. FIG. 4 illustrates an embodiment in which the system includes a leash and FIG. 5 illustrates an embodiment in which the system does not include a leash.

In step 1 of FIGS. 4 and 5, a strap system (e.g., collar/harness and optional leash system 10 of FIG. 1) may be wrapped to form a first loop for a dog collar.

In step 2 of FIGS. 4 and 5, the strap system may be fastened, for example, using a first connector means, such as a pair of male/female snap ends, to fit the size of the first collar loop. When multiple pairs of snap ends are provided, the strap system may be connected at the best-fitting pair.

In step 3 of FIGS. 4 and 5, ends of the strap system may be pulled under the animal (between the front legs) toward the tail end and then up around the animal to the top of the animal's back.

In steps 4 and 5 of FIG. 4 and steps 4-6 of FIG. 5, the ends of the strap system may be connected at the top of the animal's back, for example, using a second connector means, such as loop or ring fasteners. When ring fasteners are used, one end of the strap system may be threading through the rings in over and under configuration. For example, the strap end may be pulled through two rings, folded around, and passed over the first ring and under the second ring.

In step 6 of FIG. 4, the extra strap length is used an integral leash and the collar/harness/leash system is completely assembled and ready for use (to walk the animal).

In step 7 of FIG. 5, the extra strap length may be connected to the body of the strap system using additional connector means and in step 8, the connector means may be actuated to secure the extra strap length.

In step 9 of FIG. 5, the collar/harness system is completely assembled and, once a leash is attached, is ready for use (to walk the animal).

Other steps or orders of steps may be provided.

It may be appreciated that, although the strap systems are show in FIGS. 4 and 5 to be assembled on an animal, these strap systems may also be mostly assembled off of the animal after which fine adjustments may be made on the animal, for example, for a snug fit.

It may be appreciated that, when used herein, a conventional collar refers to material that encircles an animal's neck, a conventional harness refers to material that attaches to an animal's chest or torso and a conventional leash refers to material having a handle extending from the collar or harness so as to walk an animal. However, according to embodiments of the invention, especially when these elements are integrated in a combination collar/harness/and/or leash system, each of these elements may serve multiple purposes, encircling the neck (to form a collar) and encircling the torso (to also form a harness) and, in some embodiments, also extending (to also form a leash). Accordingly, each or all of these elements may be referred to as a collar, a harness, a leash or a combination collar/harness and/or leash system.

It may be appreciated that, when used herein, a figure-eight design may be defined by a minimum of two loops. The loops need not be perfectly circular or elliptical but may have any closed shape (conforming to the curve of the animal when attached). Each loop typically has a point at the joining surface. Furthermore, in some figure-eight designs, the top and the bottom loops may be separated, for example, by a gap or length of material. It may also be appreciated that the terms "top" and "bottom" loops are meant to differentiate a first loop and a second loop and they may be positioned in any relative orientation, for example, the bottom above the top, side-by-side, etc.

It is to be recognized that modifications and adaptations to the invention as set forth herein may be realized without departing from the inventive scope of the invention. For example, other types of connector means may be incorporated. In addition, provisions may be made for the collar to support pockets or other containers to allow the animal to transport items.

What is claimed is:

1. A method for assembling an animal harness, the method comprising: obtaining a single strap having a length and including a plurality of fixed connecting means attached along the length of the strap;

folding a mid-segment of the single strap and selectively engaging a first fixed connecting means of the plurality of fixed connecting means at a first pair of surfaces along the length of the strap to form a first loop adapted for use as a collar, wherein the first pair of surfaces comprise multiple positions along the length of the strap to adjust a size of the first loop;

folding the ends of the single strap together and selectively engaging a second fixed connecting means of the plurality of fixed connecting means at a second pair of surfaces along the length of the strap to form a second loop adapted for use as a harness, wherein the second pair of surfaces comprise multiple positions along the length of the strap to adjust a size of the second loop; and providing a leash that extends from the second loop.

2. The method of claim 1, wherein the first and second loops are assembled in a figure-eight design.

3. The method of claim 1, wherein the leash is integral to and extends from one of the ends of the strap such that the collar, harness and leash are all formed from a single continuous length of material.

4. The method of claim 1, wherein the ends of the strap are assembled to terminate at the second loop.

5. The method of claim 4 comprising attaching the leash as a separate strap to the second loop at a position at or near the back of an animal.

6. The method of claim 1, wherein the first fixed connecting means are arranged in a cluster.

7. The method of claim 1 comprising pulling the ends of the strap under an animal toward a tail end of the animal and then up around the animal to a top of the animal's back.

8. The method of claim 3, wherein the ends of the single strap extend to different lengths, wherein the longer end of the strap forms the leash.

9. The method of claim 1, wherein the folded mid-segment is spaced from a midpoint of the strap to provide one longer end of the strap used to form the leash.

10. The method of claim 1, wherein the folded mid-segment is near a midpoint of the strap to form two ends of the strap with approximately equal length.

* * * * *